April 12, 1927.
J. LANDIS
1,624,256
AUTOMATIC DRIVE GATE
Filed Sept. 2, 1925   2 Sheets-Sheet 1
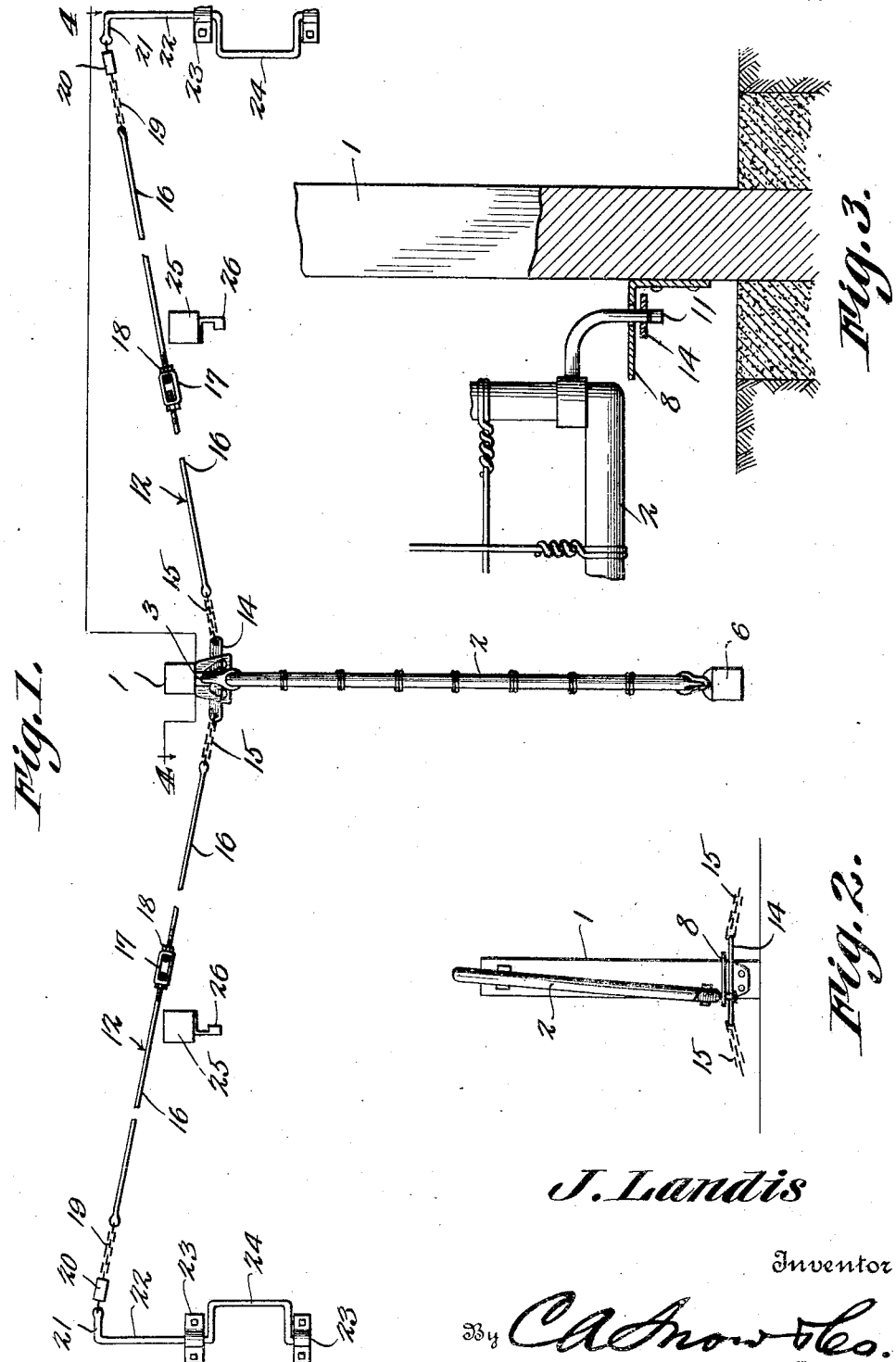
J. Landis
Inventor
By C.A.Snow & Co.
Attorneys April 12, 1927.
J. LANDIS
AUTOMATIC DRIVE GATE
Filed Sept. 2, 1925
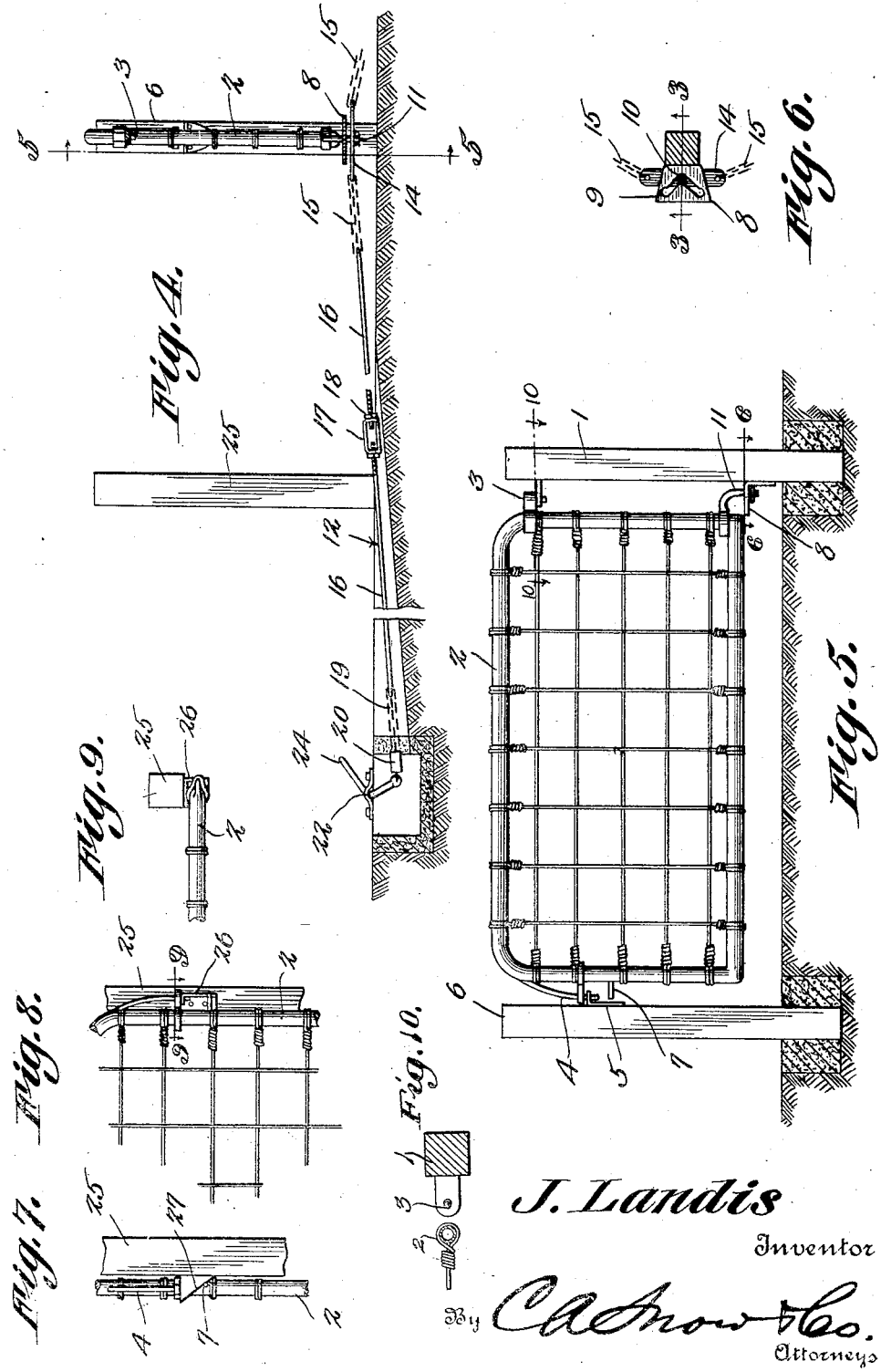
J. Landis
Inventor Patented Apr. 12, 1927.

1,624,256

UNITED STATES PATENT OFFICE.

JEREMIAH LANDIS, OF BROOKVILLE, OHIO.

AUTOMATIC DRIVE GATE.

Application filed September 2, 1925. Serial No. 54,093.

This invention aims to provide novel means whereby a gate may be operated, to open and close it, as a vehicle approaches the gate and passes the gate.

It is within the province of the disclosure to improve generally and to enhance the utility of devices of that sort to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 shows in top plan, a device constructed in accordance with the invention; Figure 2 is an elevation wherein the gate is shown tilted and ready to swing open; Figure 3 is a sectional view showing a portion of the mounting of the gate; Figure 4 is a sectional view wherein the gate is viewed endwise; Figure 5 is a section taken about on the line 5—5 of Figure 4; Figure 6 is a section on the line 6—6 of Figure 5; Figure 7 is an elevation showing the gate in operative relation to one of the lateral posts; Figure 8 is an elevation of the structure shown in Figure 7; Figure 9 is a section on the line 9—9 of Figure 8; Figure 10 is a cross section on the line 10—10 of Fig. 5.

The numeral 1 marks a support or post, whereunto the upper inner corner of a gate 2 is pivoted at 3 for horizontal and for vertical swinging movement. The free edge of the gate 2 is provided with a latch 4 adapted to cooperate with a keeper 5 on a post 6, when the gate is closed. The free edge of the gate has an outstanding projection or pin 7. A horizontal bracket 8 is mounted on the post 1 and has a V-shaped slot 9, the apex of the slot forming a seat 10. The gate 2 is supplied near its lower corner with a depending finger 11 movable in the slot 9 of the bracket 8 and received in the seat 10, when the gate 2 is closed.

The numeral 12 designates an operating member of any desired sort. The operating member 12 is a composite structure including a link 14 located below the horizontal bracket 8, the depending finger 11 of the gate 2 being pivoted in the link. By means of chains 15 or the like, the ends of the link 14 are connected to two-part rods 16 wherein turnbuckles 17 are interposed, the turnbuckles being held in place by lock nuts 18, the operating member 12, therefore, being longitudinally extensible. Chains 19 or the like are connected to the outer ends of the rods 16 and are connected to weights 20 which are pivoted to the arms of transverse shafts 22 mounted to rock in bearings 23 on the roadway, the shafts 22 being supplied with inclined cranks 24 adapted to be engaged by the wheels of vehicles, the weights 20 aiding in maintaining the cranks in proper position.

Lateral posts 25 are disposed on opposite sides of the main post 1 and are provided with keepers 26, the lower edges of which are upwardly and outwardly inclined, as shown at 27, in Figure 7 of the drawings.

In practical operation, when the wheel of a vehicle strikes one of the cranks 24, the corresponding shaft 22 is rocked, and the arm 21 exerts a pull on the operating member 12, the finger 11 on the gate 2 sliding laterally and forwardly in one of the branches of the V-shaped slot 9 in the bracket 8, the free end of the gate 2 being lifted, to disengage the latch 4 from the keeper 5, and the gate being inclined, as shown in Figure 2, so that the gate will tend to swing to an open position, the latch 4 engaging with one of the keepers 26 on the lateral posts 25, and the projection 7 on the free edge of the gate 2 being disposed below the inclined edge 27 of the keeper 26, as shown in Figure 7. When the vehicle passes over the crank 24 of the other shaft 22, the gate swings to a closed position with respect to the post 6, in a way which will be understood clearly from the drawings. When the gate is started toward a closed position, the gate is lifted at its free edge, and the projection 7 on the gate, cooperating with the inclined edge 27 of the keeper 26 on the lateral post 25, starts the gate toward a closed position, with a quick motion.

What is claimed is:—

In a device of the class described, a support, a gate pivotally mounted at its upper inner corner on the support for vertical and horizontal swinging movement, a bracket on the support and provided with a V-shaped slot, a depending finger on the lower inner corner of the gate and received slidably in the slot, shafts mounted for rocking movement and located on opposite sides of the gate, the shafts being provided with vehicle engaging cranks, and having arms, an operating member connecting the arms, the operating member being pivotally mounted intermediate its ends, on the finger of the gate, and a lateral support having an inclined edge, the gate having a projection which cooperates with said inclined edge, when the gate is lifted in an open position, thereby to start the gate rapidly toward a closed position.

In testimony that I claim the foregoing as my own, I have hereto affixed my signature.

JEREMIAH LANDIS.